(12) United States Patent
Williams et al.

(10) Patent No.: US 9,803,685 B2
(45) Date of Patent: Oct. 31, 2017

(54) CRANKSHAFT

(71) Applicant: Ford Global Technologies, LLC, Dearborn, MI (US)

(72) Inventors: Rick L. Williams, Canton, MI (US); Jeffrey Eliot Chottiner, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 15/046,413

(22) Filed: Feb. 17, 2016

(65) Prior Publication Data

US 2017/0234359 A1    Aug. 17, 2017

(51) Int. Cl.

| F02B 75/32 | (2006.01) |
|---|---|
| F16C 3/06 | (2006.01) |
| F02B 75/20 | (2006.01) |
| F02B 75/18 | (2006.01) |

(52) U.S. Cl.
CPC .............. *F16C 3/06* (2013.01); *F02B 75/20* (2013.01); *F02B 2075/1816* (2013.01)

(58) Field of Classification Search
CPC ..... F16C 3/06; F02B 75/20; F02B 2075/1816
USPC ...................................................... 123/197.4
See application file for complete search history.

(56) References Cited

U.S. PATENT DOCUMENTS

| 2,568,576 | A |  | 9/1951 | Witzky |  |
|---|---|---|---|---|---|
| 2,711,205 | A |  | 6/1955 | Brown |  |
| 3,650,143 | A |  | 3/1972 | Ruget |  |
| 4,901,692 | A | * | 2/1990 | Madden | F02B 75/20 123/192.2 |
| 6,779,245 | B1 | * | 8/2004 | Strand | F02F 7/0007 29/527.6 |
| 8,145,410 | B2 |  | 3/2012 | Berger |  |
| 8,757,027 | B2 |  | 6/2014 | Williams |  |
| 2004/0187637 | A1 |  | 9/2004 | Gokan |  |
| 2009/0301428 | A1 | * | 12/2009 | Lee | F16C 3/06 123/197.4 |

(Continued)

FOREIGN PATENT DOCUMENTS

| CN | 2742165 Y | 11/2005 |
|---|---|---|
| EP | 0728954 A2 | 8/1996 |
| JP | H08105431 A | 4/1996 |

*Primary Examiner* — Marguerite McMahon
(74) *Attorney, Agent, or Firm* — Gregory P. Brown; Diana D. Brehob; Brehob Law, PLLC

(57) ABSTRACT

It is common for crankshafts of internal combustion engines to have main bearing journals provided between each of the conrod bearing journals. However, to reduce engine friction, the fewest main bearing journals that can be used while still meeting the design targets is preferred. A crankshaft for an in-line, four-cylinder engine, according to an embodiment of the disclosure, has three main bearing journals. Bridges, one each located between first and second conrod bearing journals and between third and fourth conrod bearing journals. The bridges have a cross-section with at least two concavities to improve the strength of the bridge compared to, for example, a cylindrical bridge, without greatly increasing the mass of material used in the bridge. Furthermore, a locus of a centroid of cross sections through the bridge are not coincident with an axis of rotation of the crankshaft, but instead is displaced toward the nearer conrod bearing journal.

20 Claims, 4 Drawing Sheets

(56) References Cited

U.S. PATENT DOCUMENTS

2009/0314247 A1* 12/2009 McRae .................. F02B 75/32
    123/197.4
2012/0234270 A1    9/2012 Keating
2014/0041618 A1    2/2014 Williams

* cited by examiner

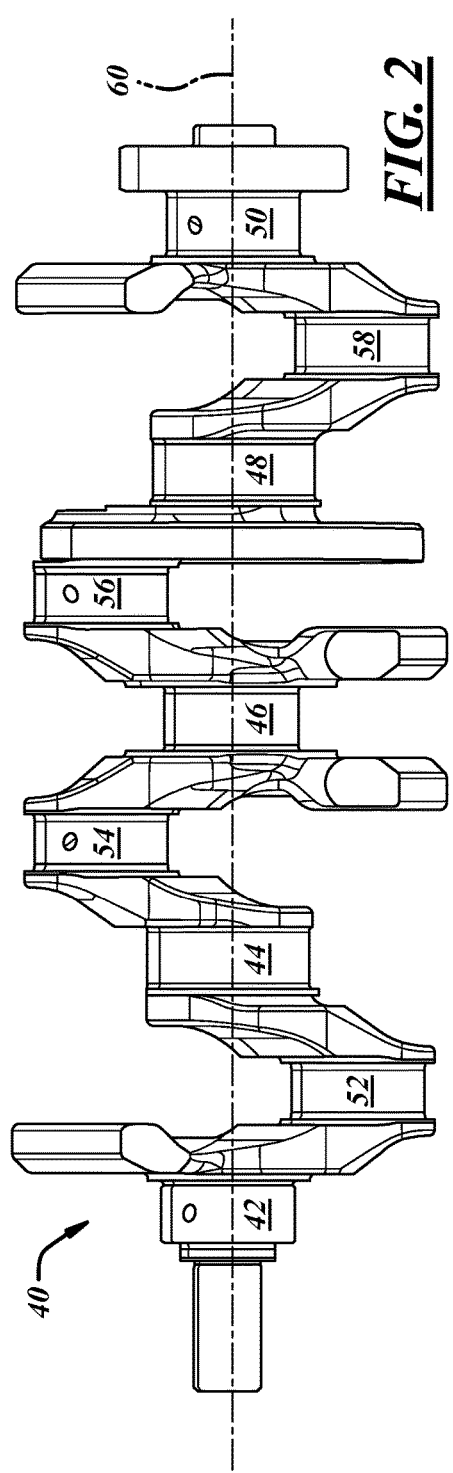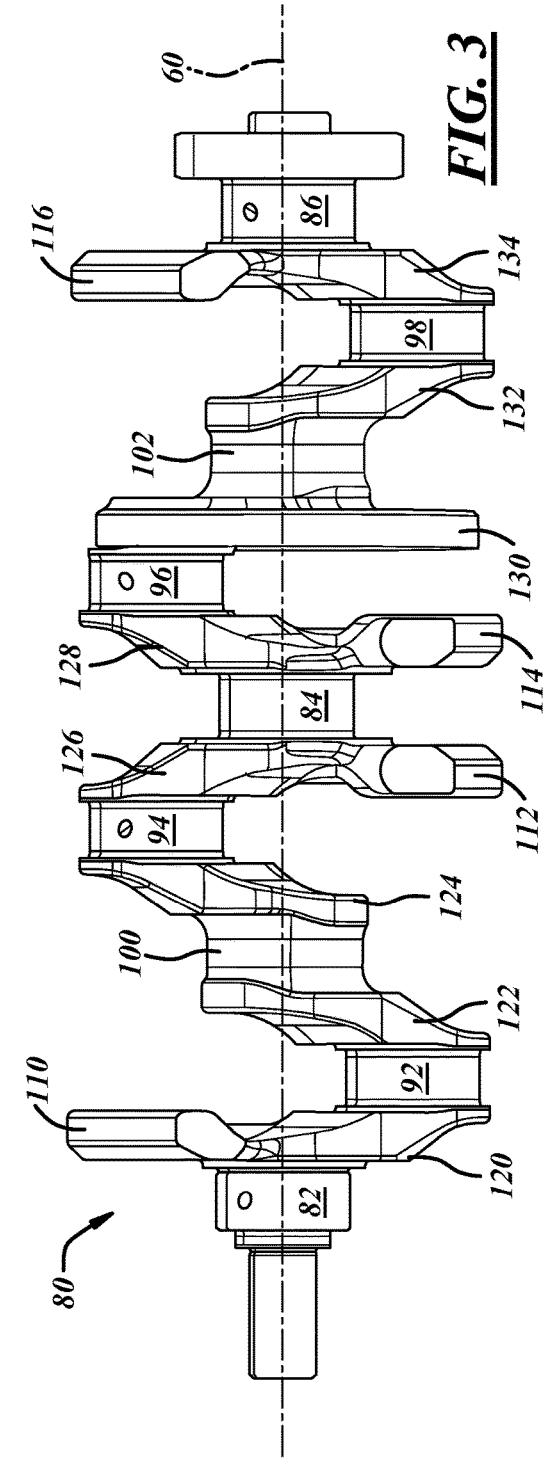

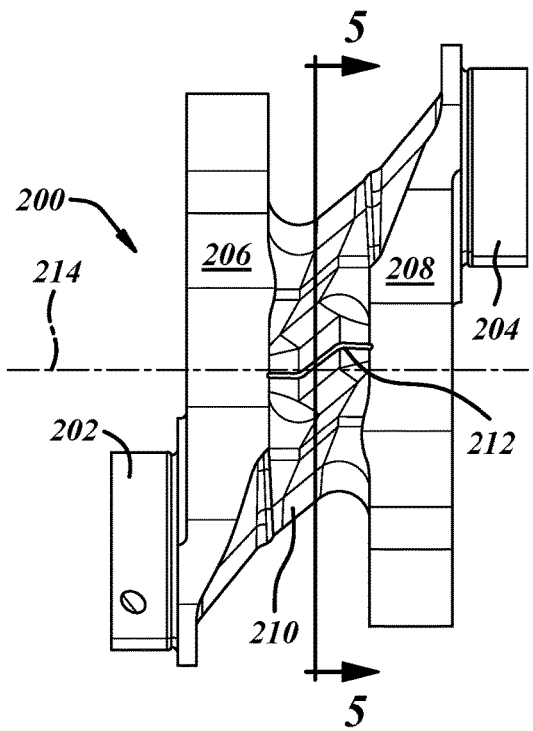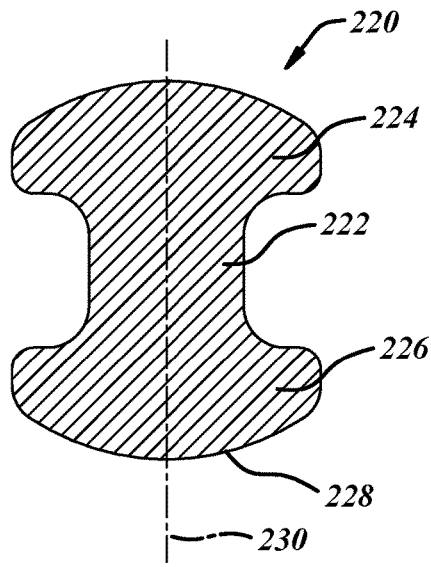
FIG. 4
FIG. 5
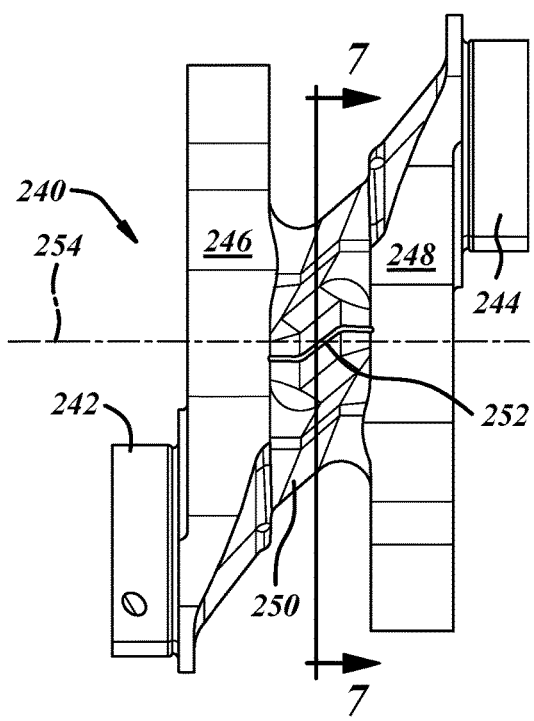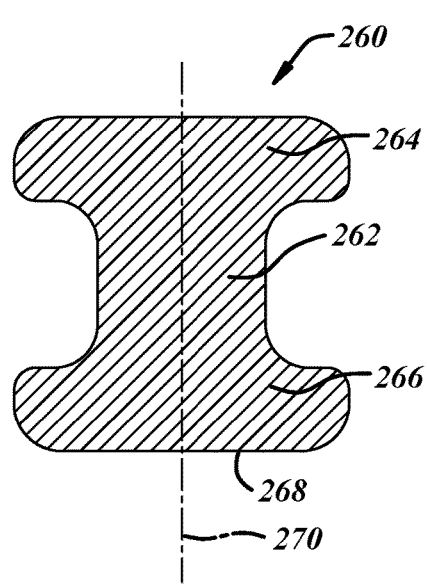
FIG. 6
FIG. 7

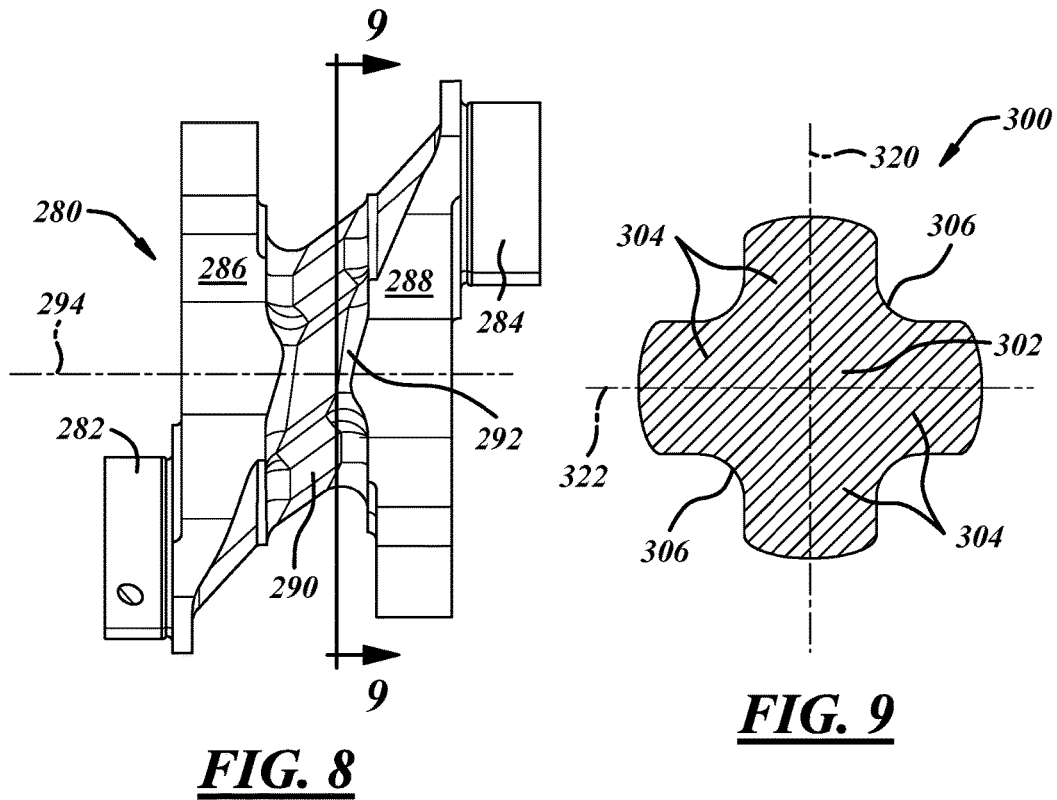
FIG. 8
FIG. 9
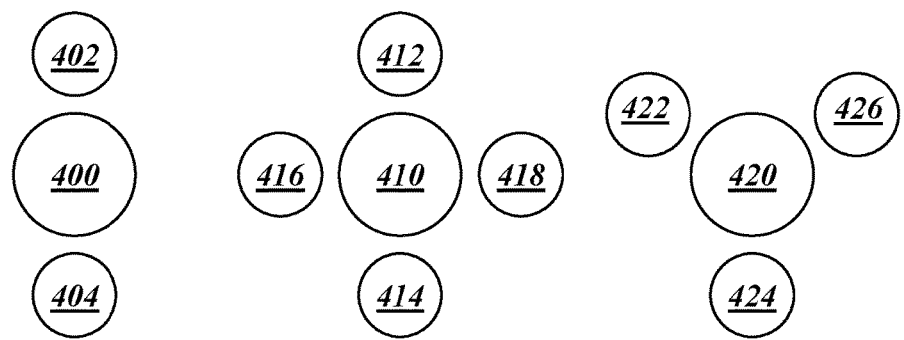
FIG. 10  FIG. 11  FIG. 12

CRANKSHAFT

FIELD

The present disclosure relates to crankshafts for internal combustion engine, in particular crankshafts with a reduced number of main bearing journals.

BACKGROUND

It is typical for a crankshaft in a 4-cylinder, in-line engine to have five main bearing journals. A cross-section of a portion of such an engine 10 is shown in FIG. 1. Engine 10 has four cylinders 12 in which four pistons 14 are installed. Pistons 12 are coupled to a crankshaft 22 via connecting rods 18 that couple between a wrist pin 16 on piston 14 a conrod bearing journal 28 on crankshaft 22. Connecting rod 18 is coupled to wrist pin 16 by having the wrist pin slide through an opening at one end of connecting rod 18 as well as openings through piston 14. Connecting rod 18 has a bearing cap 20 that secures it to conrod bearing journal 28. A shell bearing is commonly placed between a concave surface of connecting rod 18 and the outer, convex surface of conrod bearing journal 28 (not shown in FIG. 1).

Crankshaft 22 has main bearing journals 23, 24, 25, 26, and 27 such that there is a main bearing journal provided between each adjacent pair of conrod bearing journals 28 and one at each end of engine 10 as well. The block of engine 10 has an upper portion 32 and a lower portion 34, the latter of which is sometimes called a ladder. Main bearing journal supports 35, 36, 37, 38, and 39 are provided in lower portion 34 of the block and main bearing journal supports 135, 136, 137, 138, and 139 are provided in upper portion 32 of the block. Bearing journal supports 35 and 135 support main bearing journal 23 with a shell bearing 30 provided between journal 23 and supports 35, 135. A shell bearing is provided for each main journal bearing 23, 24, 25, 26, and 27.

In FIG. 2, a closer view of a prior art crankshaft 40 shows five main bearing journals 42, 44, 46, 48, and 50 with conrod bearing journals 52, 54, 56, and 58 each between an adjacent pair of main bearing journals. Center lines of main bearing journals 42, 44, 46, 48, and 50 are coincident with an axis of rotation 60 of crankshaft 40, whereas, centerlines of conrod bearing journals 52, 54, 56, and 58 are offset from axis 60.

Reducing the number of main bearing journals is desirable to reduce the rotational friction of the engine. This is known in the prior art, but is generally not in use because of inferior bending, torsional stiffness, durability, and NVH characteristics of such a configuration. An example of such a crankshaft 80 is shown in FIG. 3. Three main bearing journals 82, 84, and 86 are provided with: two conrod bearing journals 92 and 94 between adjacent main bearing journals 82 and 84 and two conrod bearing journals 96 and 98 between adjacent main bearing journals 84 and 86. Elements 100 and 102, which could be machined to form main bearing journals in a crankshaft with five main bearing journals, are simply bridges in crankshaft 80. Bridges 100 and 102 are unmachined such that outer surface is rough. In the embodiment shown in FIG. 3, the surface is slightly curved to avoid any stress risers, i.e., clearly not a bearing surface. It was found through modeling that bridges 100 and 102 have insufficient torsional stiffness and resistance to bending for the design goals of cylinder pressure and forces on the crankshaft, thereby would lead to premature failure.

In FIG. 3, counterweights 110, 112, 114, and 116 are provided on crankshaft 80. Furthermore, webs 120, 122, 124, 126, 128, 130, 132, and 134 are arranged with respect to the journal bearings as indicated in the table below:

| Groupings | Left web | Journal bearing | Right web |
|---|---|---|---|
| $1^{st}$ journal | 120 | 92 | 122 |
| $2^{nd}$ journal | 124 | 94 | 126 |
| $3^{rd}$ journal | 128 | 96 | 130 |
| $4^{th}$ journal | 132 | 98 | 134 |

Web 130 is different than webs 120, 122, 124, 126, 128, 132, and 134. Web 130 a machined surface possibly including gear teeth that can be used to drive an oil pump, fuel pump, or other engine accessory. This is a non-limiting example and any of the webs could be machined for an additional purpose.

A need exists for a crankshaft for an inline, 4-cylinder engine that can be supported using only three main bearings to meet the design goals without undue bending, reduced durability, or other operational difficulties. Furthermore, such crankshaft should be comparable in weight and cost, i.e., cannot include exotic materials and/or costly machining processes.

SUMMARY

A crankshaft that overcomes at least some of the problems in the prior art is disclosed herein. In one embodiment, the crankshaft has first and second main bearing journals, first and second control bearing journals located between the first and second main bearing journals and a bridge located between the first and second conrod bearing journals in which an outer surface of the bridge has at least two concavities.

The nearest main bearing journal to the first main bearing journal is the second main bearing journal.

The first and second main bearing journals are cylindrical with a central axis of the first and second main bearing journals coincident with an axis of rotation of the crankshaft. In some embodiments, the cross section of the bridge taken through the bridge in a direction perpendicular to the axis of rotation of the crankshaft has a substantially straight member with a first flange on a first end of the straight member and a second flange on a second end of the straight member. In some embodiments, an outer edge of the first and second flanges is substantially flat and in other embodiments, the outer edge of the first and second flanges is curved.

The first and second main bearing journals are cylindrical with a central axis of the first and second main bearing journals being coincident with the axis of rotation of the crankshaft. In some embodiments, a cross section of the bridge taken through the bridge in a direction perpendicular to the axis of rotation of the crankshaft is cross-shaped and the outer surface of the bridge has four concavities. In some embodiments, the bridge's cross shape has a first straight member that crosses through a second straight member and the first and second straight member are perpendicular. In other embodiments the bridge's cross shape has a first straight member that crosses through a second straight member and the first and second straight member form an angle of sixty degrees The first and second main bearing journals are cylindrical with a central axis of the first and second main bearing journals being coincident with the axis of rotation of the crankshaft. The first and second conrod bearing journals are cylindrical with a central axis of the first and second conrod bearing journals being parallel to and displaced from the axis of rotation of the crankshaft. The first conrod bearing journal is diametrically opposed from the second conrod bearing journal with respect to the axis of rotation of the crankshaft. A first web is disposed along the crankshaft between the first conrod bearing journal and the bridge. A second web is disposed along the crankshaft between the second conrod bearing journal and the bridge. A locus of centroids of cross sections through the bridge is closer to the nearer conrod bearing journal than the axis of rotation of the crankshaft.

In some embodiments, a cross-section of the bridge taken perpendicular to an axis of rotation of the crankshaft has a substantially straight member with two flanges on both ends of the straight member.

Also disclosed is an engine block having a plurality of cylinders disposed therein, a piston disposed in each of the cylinders, a connecting rod coupled to each of the pistons via a wrist pin, a crankshaft having a plurality of main bearing journals and a plurality of conrod bearing journals. The connecting rods are each coupled to a conrod bearing journal. A pair of conrod bearing journals are disposed between two main bearing journals without a main bearing journal therebetween. A bridge is provided between the pair of conrod bearing journals. The bridge has a non-circular cross section with at least two concavities.

In some embodiments, the cross-section of the bridge taken perpendicular to an axis of rotation of the crankshaft has a straight member with flanges on both ends of the straight member. In some embodiments, the outer edges of the flanges are straight and in other embodiments, curved.

The conrod bearing journals are offset from the axis of rotation of the crankshaft. A locus of centroids of cross sections through the bridge taken perpendicularly to the axis of rotation is displaced from the axis of rotation in a direction toward the nearer of the conrod bearing journals.

In embodiments in which the engine is a four-cylinder, inline engine. The engine has first, second, third, and fourth conrod bearing journals and first, second, and third main bearing journals. The first and second conrod bearing journals are disposed between the first and second main bearing journals. The third and fourth conrod bearing journals are disposed between the second and third main bearing journals. The first main bearing journal is the nearest main bearing journal to the second main bearing journal. The third main bearing journal is the nearest main bearing journal to the second main bearing journal. The engine block has bearing supports for the main bearing journals. A first of the bearing supports is located near a first end of the engine. A second of the bearing supports is located near a second end of the engine. A third of the bearing supports is located between the first and second bearing supports without additional bearing supports located between the third and the second bearing supports and without additional bearing supports located between the first and the second bearing supports. Webs are provided on both sides of: each of the bridges, each of the conrod bearing journals, and the second main bearing journal.

Also disclosed is a crankshaft that includes: a first main bearing journal, a first web immediately adjacent to the first main bearing journal, a first conrod bearing journal immediately adjacent to the first web, a second web immediately adjacent to the first conrod bearing journal, a first bridge immediately adjacent to the second web, a third web immediately adjacent to the first bridge, a second conrod bearing journal immediately adjacent to the third web, a fourth web immediately adjacent to the second conrod bearing journal, a second main bearing journal immediately adjacent to the fourth web, a fifth web immediately adjacent to the second main bearing journal, a third conrod bearing journal immediately adjacent to the fifth web, a sixth web immediately adjacent to the third conrod bearing journal, a second bridge immediately adjacent to the sixth web, a seventh web immediately adjacent to the second bridge, a fourth conrod bearing journal immediately adjacent to the seventh web, an eighth web immediately adjacent to the fourth conrod bearing journal, and a third main bearing journal immediately adjacent to the eighth web. Cross sections of the first and second bridges taken perpendicularly with respect to the axis of rotation of the crankshaft have at least two concavities.

In the cross sections of the first and second bridges have a straight member with a flange on each end of the straight member.

A locus of centroids of cross sections through the bridge is displaced toward the nearer conrod bearing journal than the axis of rotation.

BRIEF DESCRIPTION OF THE DRAWINGS

FIGS. 2 and 3 show prior art crankshafts for four-cylinder engines having five and three main bearing journals, respectively;

FIGS. 4, 6, and 8 are illustrations of a portion of a crankshaft showing a bridge, in place of a main bearing, according to various embodiments of the disclosure;

FIGS. 5, 7, and 9 show cross-sections of the bridges in FIGS. 4, 6, and 8, respectively; and FIGS. 10, 11, and 12 are sketches of end views of only the main and conrod bearing journals of crankshafts for inline 4, V8, and inline 6 engines.

DETAILED DESCRIPTION

Figure 1:
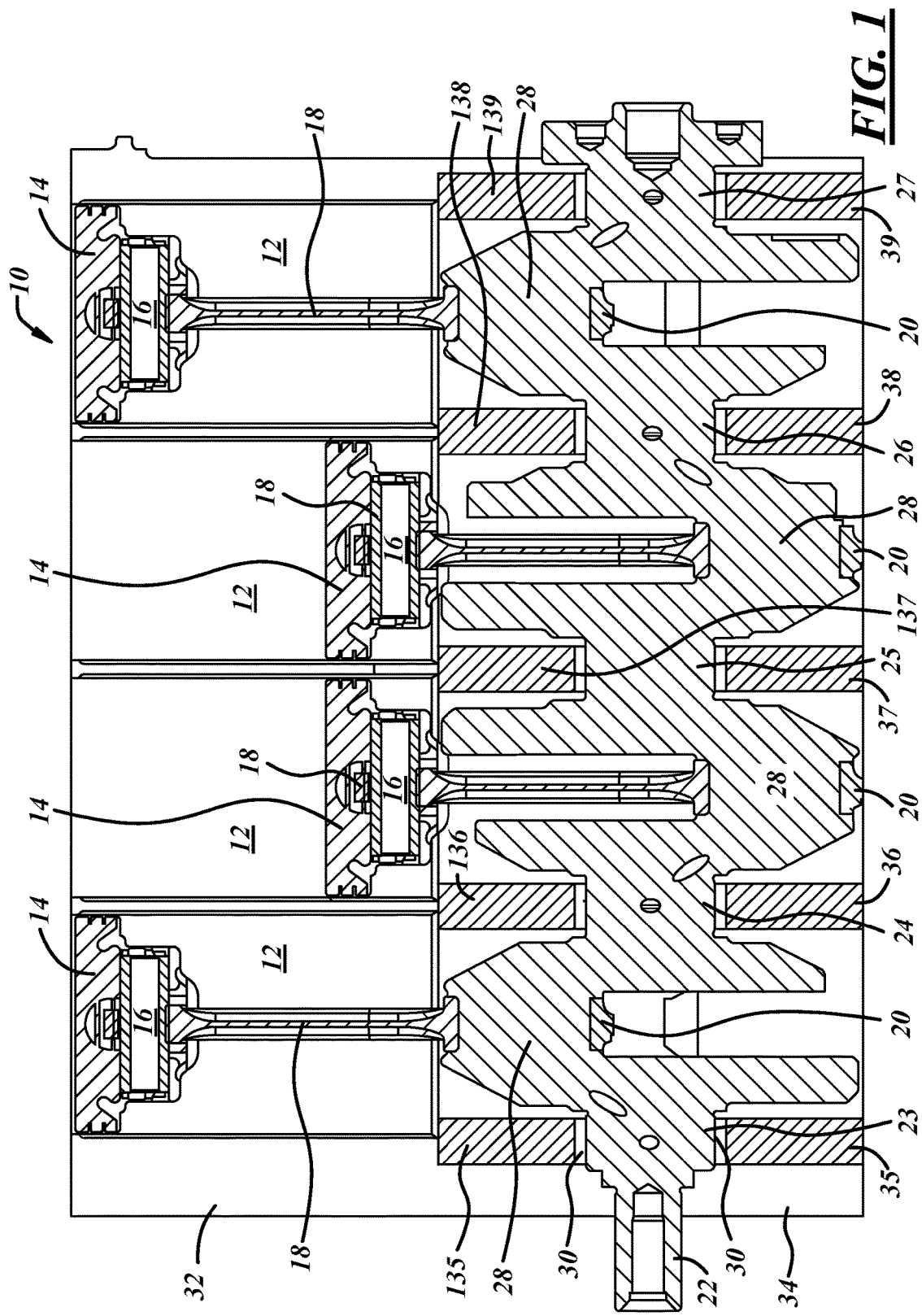
FIG. 1 is a cross-section of a portion of a prior-art, four-cylinder, in-line engine.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

A portion of a crankshaft 200 according to an embodiment of the disclosure is shown in FIG. 4. The full crankshaft, that would include the portion shown in FIG. 4, is similar to that shown in FIG. 3, except for bridges 100 and 102 and the webs that are immediately adjacent to bridges 100 and 102. The portion of the crankshaft illustrated in FIG. 4 is essentially a replacement of elements 92 through 94 along the length of crankshaft 80 into FIG. 3. Elements 96 through 98 along the length of crankshaft 80 (in FIG. 3) would also be replaced by the portion of crankshaft 200 shown in FIG. 4.

The portion of crankshaft 200 has conrod bearing journals 202 and 204 with webs 206 and 208 directly inward from journals 202 and 204, respectively. Between webs 206 and 208 is a bridge 210. A cross section 5-5 taken through an axis of rotation 214 of the portion of crankshaft 200 is shown in FIG. 5. Cross section 220 has a substantially straight member 222 along axis 230 with flange 224 at a first end of member 222 and flange 226 at a second end of member 222. An outer edge 228 of flange 226 is rounded. Cross section 220 has two concavities on the left and the right of member 222.

In an alternative embodiment in FIG. 6, a portion of a crankshaft 240 has a first conrod bearing journal 242 immediately adjacent to a first web 246 and a second conrod bearing journal 244 immediately adjacent to a second web 248. A bridge 250 is located between webs 246 and 248. A cross section 7-7 taken through bridge 250 and taken perpendicular to an axis of rotation 254 of crankshaft 240 is shown in FIG. 7. Cross section 260 has a member 262 that has a flange 264 on a first end of member 262 and a flange 266 on a second end of member 262. An outside edge 288 of flange 266 is substantially flat. Cross section 260 has concavities on the left and right sides of member 262.

In yet another embodiment in FIG. 8, a portion of a crankshaft 280 with an axis of rotation 294 has a first conrod bearing journal 282 immediately adjacent to a first web 286 and a second conrod bearing journal 284 immediately adjacent to a second web 288. A bridge 290 is located between webs 286 and 288. A cross section 9-9 taken through bridge 290 and take perpendicular to axis 294 is shown in FIG. 9. Cross section 300 forms a cross with lobes 304 extending outwardly from a central section. Alternatively, it could be described as two straight members, one coincident with axis 320 and another coincident with axis 322 that form a cross. Between adjacent lobes 304 are concavities 306.

Bridges 100 and 102 in FIG. 3 are cylindrical with an axis of the cylinder of the bridges roughly coincident with the axis of rotation of crankshaft 80. A locus of centroids of planes cut through bridges 100 and 102, perpendicular with respect to the axis of rotation of the crankshaft would yield the central axis of bridges 100 and 102. However, a similar exercise applied to FIG. 4, a locus of centroids 212 of cross sections taken perpendicular to axis 214 generally rise from left to right. Conrod bearing journal 202 is at its lowest position in FIG. 4 and conrod bearing journal 204 is at its high position in FIG. 4. To provide the desired stiffness, the mass of material provided in bridge 210 is more concentrated nearer conrod bearing journal 202 in the left side of bridge 210 and is more concentrated nearer conrod bearing journal 204 in the right side of bridge 210. Bridge 210 generally slopes in the direction of a line between conrod bearing journals 202 and 204. A curve is provided between bridge 210 and journals 202 and 204 to prevent a stress riser.

The locus of centroids 252 for bridge 250 is shown for crankshaft 240 of FIG. 6. Similarly, the locus of centroids 292 for bridge 290 is shown for crankshaft 280 of FIG. 8. One difference is for the cross configuration, as visible in FIG. 9, the locus of centroids 292 slopes downward a small amount, when going from left to right, before sloping upward through the center portion of bridge 290.

Crankshafts 40, 80, 200, 240, and 280 in FIGS. 2, 3, 4, 6, and 8, respectively, are for a four-cylinder, in-line engine. Adjacent conrod bearing journals 52 and 54 in FIG. 2 are shown in their most downward and upward positions, respectively, as they are diametrically opposed to each other with respect to axis 60. The present disclosure is applicable to such engines, but may be employed in other engines, such as V8 engines and inline 6 engines. An end view of only the main bearing journals and conrod bearing journals are shown for an inline, 4-cylinder engine in FIG. 10. Because the main bearing journals are in line, only the front one can only see the front one, shown as element 400. The firing order for typical 4-cylinder engines are such that two conrod bearing journals are at the same crank angle and two other conrod bearing journals are 180 degrees out of phase from the others. In the view in FIG. 10, only one of each pair is visible, conrod bearings journals are shown as elements 402 and 404. In a V-8 engine, in which four cylinders from one bank and four cylinders from another bank are connected to a single crankshaft, the conrod bearing journals are phased every 90 degrees with a pair phased in each quadrant. So, only the front four conrod bearing journals 412, 414, 416, and 418 are visible. For an in-line, six-cylinder engine, pairs of cylinders are phase 120 degrees apart from the other pairs. In FIG. 12, main bearing journal 420 is surrounded by conrod bearing journals 422, 424, and 426, each of which is representing a pair of conrod bearing journals. A cross-shaped bridge 290 may be suitable for a V-8 engine as adjacent conrod bearing journals are 90 degrees out of phase.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A crankshaft, comprising:
   first and second main bearing journals;
   first and second conrod bearing journals located between the first and second main bearing journals; and
   a bridge located between the first and second conrod bearing journals wherein an outer surface of the bridge has at least two concavities.

2. The crankshaft of claim 1 wherein the nearest main bearing journal to the first main bearing journal is the second main bearing journal.

3. The crankshaft of claim 1 wherein:
   the crankshaft has an axis of rotation;
   the first and second main bearing journals are cylindrical with a central axis of the first and second main bearing journals being coincident with the axis of rotation of the crankshaft; and
   a cross section of the bridge taken through the bridge in a direction perpendicular to the axis of rotation of the crankshaft has a substantially straight member with a first flange on a first end of the straight member and a second flange on a second end of the straight member.

4. The crankshaft of claim 3 wherein an outer edge of the first and second flanges is substantially flat.

5. The crankshaft of claim 3 wherein an outer edge of the first and second flanges is curved.

6. The crankshaft of claim 1, wherein:
   the crankshaft has an axis of rotation;

the first and second main bearing journals are cylindrical with a central axis of the first and second main bearing journals being coincident with the axis of rotation of the crankshaft;

a cross section of the bridge taken through the bridge in a direction perpendicular to the axis of rotation of the crankshaft is cross-shaped; and the outer surface of the bridge has four concavities.

7. The crankshaft of claim 6 wherein, the bridge's cross shape has a first straight member that crosses through a second straight member and the first and second straight member are perpendicular.

8. The crankshaft of claim 6 wherein, the bridge's cross shape has a first straight member that crosses through a second straight member and the first and second straight member form an angle of sixty degrees.

9. The crankshaft of claim 1, wherein:

the crankshaft has an axis of rotation;

the first and second main bearing journals are cylindrical with a central axis of the first and second main bearing journals being coincident with the axis of rotation of the crankshaft;

the first and second conrod bearing journals are cylindrical with a central axis of the first and second conrod bearing journals being parallel to and displaced from the axis of rotation of the crankshaft;

the first conrod bearing journal is diametrically opposed from the second conrod bearing journal with respect to the axis of rotation of the crankshaft;

a first web is disposed along the crankshaft between the first conrod bearing journal and the bridge;

a second web is disposed along the crankshaft between the second conrod bearing journal and the bridge; and a locus of centroids of cross sections through the bridge is closer to the nearer conrod bearing journal than the axis of rotation of the crankshaft.

10. The crankshaft of claim 1 wherein a cross-section of the bridge taken perpendicular to an axis of rotation of the crankshaft has a central elongated section with two flanges on both ends of the central elongated section.

11. The engine of claim 10, wherein:

the engine is a four-cylinder, inline engine with first, second, third, and fourth conrod bearing journals and first, second, and third main bearing journals;

the first and second conrod bearing journals are disposed between the first and second main bearing journals;

the third and fourth conrod bearing journals are disposed between the second and third main bearing journals;

the first main bearing journal is the nearest main bearing journal to the second main bearing journal; and the third main bearing journal is the nearest main bearing journal to the second main bearing journal.

12. The engine of claim 11 wherein:

the engine block comprises bearing supports for the main bearing journals;

a first of the bearing supports is located near a first end of the engine;

a second of the bearing supports is located near a second end of the engine;

a third of the bearing supports is located between the first and second bearing supports without additional bearing supports located between the third and the second bearing supports and without additional bearing supports located between the first and the second bearing supports;

webs are provided on both sides of: each of the bridges, each of the conrod bearing journals, and the second main bearing journal.

13. An internal combustion engine, comprising:

an engine block having a plurality of cylinders disposed therein;

a piston disposed in each of the cylinders;

a connecting rod coupled to each of the pistons via a wrist pin;

a crankshaft having a plurality of main bearing journals and a plurality of conrod bearing journals wherein:

the connecting rods are each coupled to a conrod bearing journal;

a pair of conrod bearing journals are disposed between two main bearing journals without a main bearing journal therebetween;

a bridge is provided between the pair of conrod bearing journals; and the bridge has a non-circular cross section with at least two concavities.

14. The engine of claim 13 wherein a cross-section of the bridge taken perpendicular to an axis of rotation of the crankshaft has a straight member with flanges on both ends of the central elongated section.

15. The engine of claim 14 wherein outer edges of the flanges are one of substantially straight and curved.

16. The engine of claim 14 wherein a cross-section of the bridge taken perpendicular to an axis of rotation of the crankshaft is generally cross shaped with two straight members that cross.

17. The engine of claim 13 wherein:

the crankshaft has an axis of rotation;

the conrod bearing journals are offset from the axis of rotation of the crankshaft; and a locus of centroids of cross sections through the bridge taken perpendicularly to the axis of rotation of the crankshaft is displaced from the axis of rotation of the crankshaft in a direction toward the nearer of the conrod bearing journals.

18. A crankshaft for an internal combustion engine, comprising:

a first main bearing journal;

a first web immediately adjacent to the first main bearing journal;

a first conrod bearing journal immediately adjacent to the first web;

a second web immediately adjacent to the first conrod bearing journal;

a first bridge immediately adjacent to the second web;

a third web immediately adjacent to the first bridge;

a second conrod bearing journal immediately adjacent to the third web;

a fourth web immediately adjacent to the second conrod bearing journal;

a second main bearing journal immediately adjacent to the fourth web;

a fifth web immediately adjacent to the second main bearing journal;

a third conrod bearing journal immediately adjacent to the fifth web;

a sixth web immediately adjacent to the third conrod bearing journal;

a second bridge immediately adjacent to the sixth web;

a seventh web immediately adjacent to the second bridge;

a fourth conrod bearing journal immediately adjacent to the seventh web;

an eighth web immediately adjacent to the fourth conrod bearing journal; and a third main bearing journal immediately adjacent to the eighth web wherein:

the crankshaft has an axis of rotation:

cross sections of the first and second bridges taken perpendicularly with respect to the axis of rotation of the crankshaft have at least two concavities.

19. The crankshaft of claim 18 wherein the cross sections of the first and second bridges have a straight member with a flange on each end of the straight member.

20. The crankshaft of claim 18 wherein a locus of centroids of cross sections through the bridge is displaced toward the nearer conrod bearing journal than the axis of rotation.

\* \* \* \* \*